United States Patent
Baker, III et al.

[19]

[11] Patent Number: 6,106,329
[45] Date of Patent: Aug. 22, 2000

[54] ADJUSTABLE MODULAR PANEL

[75] Inventors: Frank Phillips Baker, III, Chatham; Theodore Alan Conorich, Parsippany Township; Wayne Scott Filus, Lebanon; Michael Gregory German, Secaucus; William John Ivan, Woodbridge, all of N.J.

[73] Assignee: Lucent Technologies Inc., Murray Hill, N.J.

[21] Appl. No.: 09/205,767

[22] Filed: Dec. 4, 1998

[51] Int. Cl.[7] .................................................. H01R 13/60
[52] U.S. Cl. ............................................................ 439/532
[58] Field of Search .................................. 439/532, 527, 439/586, 283, 730, 932, 403; 174/84 R, DIG. 8

[56] References Cited

U.S. PATENT DOCUMENTS

| | | | |
|---|---|---|---|
| 3,858,158 | 12/1974 | Henn et al. | 439/403 |
| 5,697,811 | 12/1997 | Pickles et al. | 439/532 |
| 5,747,742 | 5/1998 | Nelson | 174/84 R |

*Primary Examiner*—Renee Luebke
*Assistant Examiner*—Michael C. Zarroli
*Attorney, Agent, or Firm*—Cohen, Pontani, Lieberman & Pavane

[57] ABSTRACT

An adjustable modular panel for partially housing data carrying cables and facilitating connection between the cables and communication equipment. The modular panel includes first and second panel portions, each having an engaging edge for mating with each other and for forming between the first and second portions a trough having an area in which the cables are at least partially housed. A fastening device in the panel portions is releasably operable to secure the two panel portions together. Each panel further includes a mounting surface to which connection devices are mountable. In a preferred embodiment, a third panel having a pair of engaging edges is disposed between the first and second panel portions so that the engaging edges of the third panel mate with the engaging edges of the first and second panel portions, thereby expanding the trough area to accommodate an increased number of cables and/or cables having increased dimensions.

14 Claims, 7 Drawing Sheets

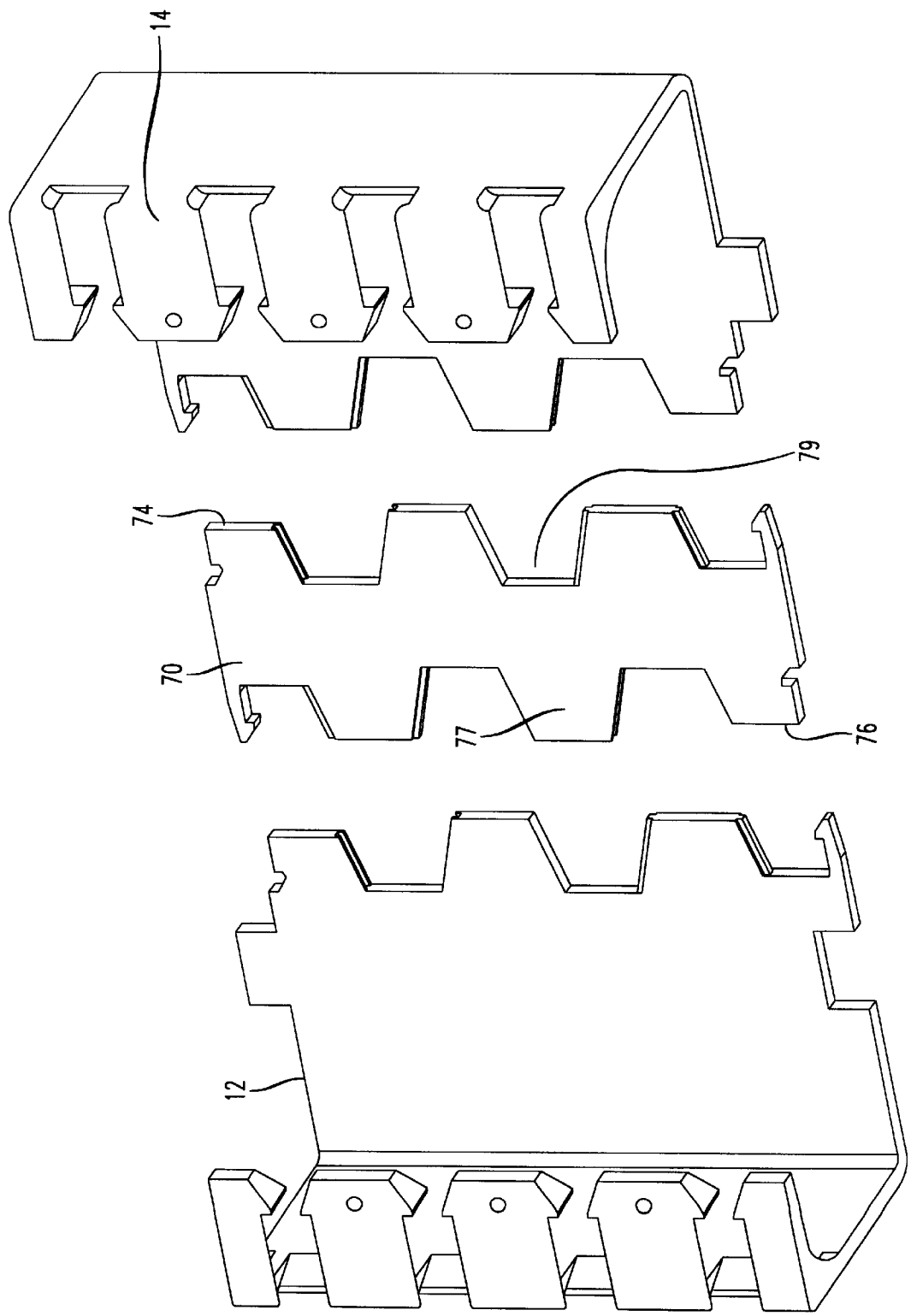

ADJUSTABLE MODULAR PANEL

BACKGROUND OF THE INVENTION

I. Field of the Invention

The present invention relates to the installation of telecommunication hardware for facilitating the routing and connection of data carrying cables to communication equipment. More particularly, the present invention pertains to a modular panel for providing an interface between data carrying cables and terminal devices.

II. Description of the Related Art

Terminal block panels are hardware devices used in the communication equipment industry to connect cables to terminal equipment contained within an environment, e.g. office suites, apartment buildings, etc. The panels are typically available to accommodate 900 wire pair and 300 wire pair configurations and are often mounted to a wall situated within a closet in the equipment environment. The panels contain a securing surface that is affixed or fastened to the closet wall, and a mounting surface configured into a plurality of tangs upon which connecting devices such as connecting blocks are secured. The connecting blocks interface data carrying cables such as exterior cables that route data to and from the environment, to cables connected to, for example, terminal devices.

To accommodate the data carrying cables, existing terminal block panels are configured to form a trough between the securing surface and the mounting surface through which a portion of the data carrying cables are routed. The terminal block panels are constructed as standard sized components and, therefore, the dimensions of the trough formed therein (e.g. the length and width of the trough) is fixed. However, with ever-increasing demands for data carrying capacity of communications systems, the number of cables as well as the cable dimensions (e.g. cable diameter) required to meet this demand also increase, thus requiring more trough space which is, in many instances, unavailable using currently available apparatus.

SUMMARY OF THE INVENTION

In accordance with the present invention, an adjustable modular panel is provided for selectively varying the trough space formed within a modular panel so as to accommodate an increased number of communication cables or communication cables having an increased diameter over heretofore standard cable dimensions and wider connecting hardware panels. The adjustable modular panel includes a first panel and a second panel, each having a mounting surface for accommodating the fastening of connection devices and an engaging edge. When the first and second panels are positioned in close proximity to each other with the engaging edges in abutting relation, a trough having a particular width is formed for partially housing the data carrying cables. Fastening devices connected between the first and second panels are provided for securing the panels to each other when the fastening device is in a locked position and for facilitating expansion of the trough width when the fastening device is in a released position.

In a preferred embodiment, the engaging edges of the first and second panels are crenellated to form a series of alternating recesses and protrusions such that when the engaging edges of the panels are brought into close proximity to each other, the protrusions of the first panel seat within the recesses of the second panel and vice-versa.

In another preferred embodiment, an extension panel having two engaging edges is provided for positioning between the engaging edges of the first and second panels. The extension panel engaging edges are also crenelated so that when positioned between the first and second panels, the protrusions of the engaging edges of the extension panel seat within the recesses in the engaging edges of the first and second panels, and the protrusions formed on the engaging edges of the first and second panels seat within the recesses formed in the engaging edges of the extension panel. Fastening devices are then used to fasten the extension panel between the first and second panels so that the width of the trough is increased by the length of the extension panel.

In another preferred embodiment, an adapter plate is provided for fastening to the mounting surfaces of the first and second panels for increasing the depth of the trough to accommodate additional and/or larger cables.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference numerals denote similar elements through out the several views:

FIGS. 2A–2C are exploded views of adjustable modular panels in accordance with the invention showing extension plates having varying widths;

DETAILED DESCRIPTION OF THE PRESENTLY PREFERRED EMBODIMENTS

Figure 1A:
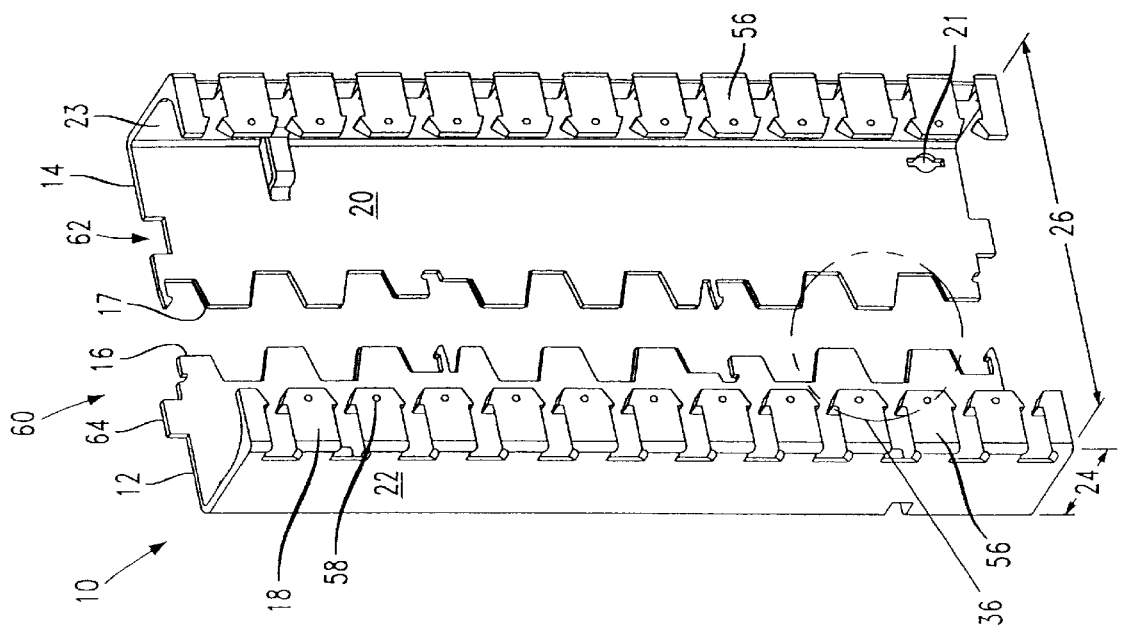
FIG. 1A is a top, perspective view of an adjustable 300 pair modular panel in accordance with the present invention.
Figure 1B:
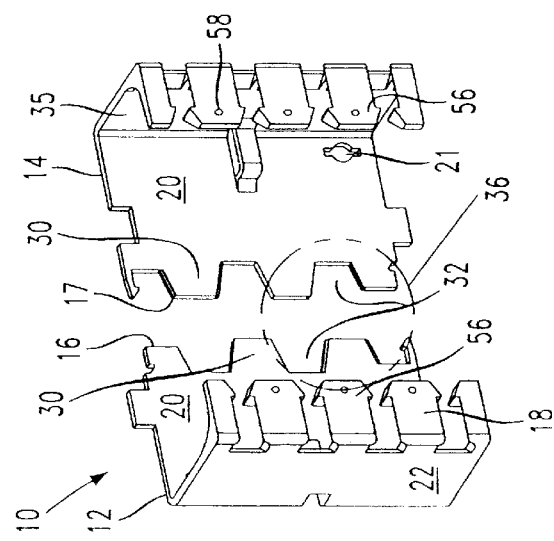
FIG. 1B is a top, perspective view of an adjustable 100 pair modular panel in accordance with the present invention.

Turning now to the drawings, an adjustable modular panel 10 in accordance with the present invention is shown in FIGS. 1A and 1B. The adjustable modular panel may as a matter of design choice be manufactured as a 300 pair device (FIG. 1A), a 100 pair device (FIG. 1B), or any other configuration as is known in the art. The modular panel 10 includes a first panel portion 12 and a second panel portion 14 that are preferably manufactured, such as by molding, from a non-conducting material and which, when attached together as more fully described below, form the modular panel 10. The second panel 14 is preferably identical to panel 12 and is shown oriented 180° with respect to panel 12. Each panel has a crenellated engaging edge 16, 17 and a mounting surface or edge 18 to which communication cables carrying data are mounted for providing communication between terminal devices.

In a typical application, the modular panel 10 is mounted in an equipment closet or other structure and provides an interface between devices contained in an environment and devices contained outside the environment. The interface is completed by way of cables passing through the panel 10 to interface devices mounted to the mounting surfaces 18 of the first and second portions 12, 14, such as by connecting the cables to, for example, connection blocks or other interfacing devices mounted to the mounting surfaces.

The engaging edges and mounting surfaces for each portion are connected to a securing surface or panel 20 having a cut-out 21 or other means for releasably mounting each portion to a hook or fastener, such as a screw (not shown) secured to or mounted on a wall or backboard. Other securing devices such as nails, clips, etc. may be used for securing the first and second panel portions 12, 14 to a wall or other structure as is known by those having ordinary skill in the art.

Each portion 12, 14 has a side wall 22, 23 which offsets each mounting surface 18 from its respective securing surface 20. When the first portion 12 and second portion 14 are connected together in an intended manner as explained below, a trough is formed which is bounded between side walls 22, 23, securing surfaces 20 and mounting surfaces 18. The trough has a depth 24 which may, for example, be the height of the side walls 22, 23, and a width 26 defined between the opposed side walls. As is known in the art, the trough is provided to house or contain or receive a plurality of communication cables (not shown), some of which simply extend through and along the trough while others are connected to devices such as connection blocks that are mounted to mounting surface 18.

Figure 1C:
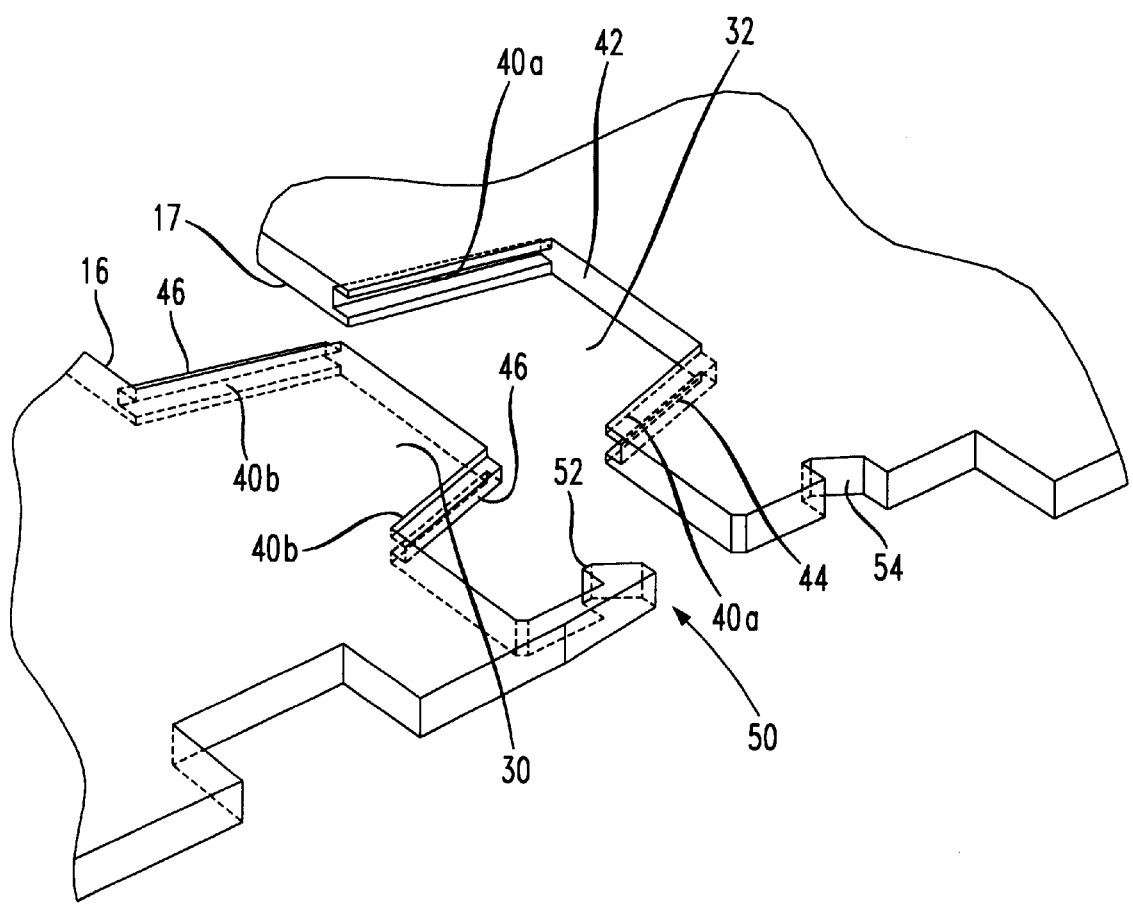
FIG. 1C is a close-up view, partially broken away, of a fastening device used on the modular panels of FIGS. 1A and 1B.

With reference now to FIGS. 1B and 1C, the crenelated engaging edges 16, 17 contain alternating protrusions 30 and recesses 32 which interlock with each other when the first panel portion 12 and the second panel portion 14 are brought into close proximity. In other words, the protrusions 30 on engaging edge 16 of first portion 12 seat within corresponding recesses 32 formed in engaging edge 17 of second portion 14. Likewise, protrusions 30 formed on engaging surface 17 seat within corresponding recesses 32 formed in engaging edge 16.

To ensure that the first portion 12 and second portion 14 remain secured to each other so that the trough will maintain containment of cables extending therethrough, the alternating protrusions 30 and recesses 32 are configured to maintain engagement between the first portion 12 and second portion 14 and a fastening feature such as device 50 is provided for locking the two portions together. The preferred configuration of the alternating protrusions and recesses 30, 32 and the fastening device 50 is shown in region 36 of FIGS. 1A and 1B, an enlarged detail of which is depicted in FIG. 1C.

As seen in FIG. 1C, each protrusion 30 and recess 32 contains a pair of angled sides 40a/b joined by a straight side 42. For each protrusion and recess, a channel/groove 44 is formed in one of the angled sides of each pair and a rail 46 is formed on the other angled side of each pair. When engaging edges 16 and 17 are brought into contact with each other, the rails 46 slide and seat within the channels 44 in a substantial tongue and groove arrangement. Although the preferred embodiment describes the rail and channel interlocking features of the first and second portions as having each protrusion and recess contain both a channel 44 and a rail 46, i.e. a channel formed on one angled side of a pair of angled sides on a recess and a rail formed on the other of the angled sides from the pair on the same recess, other configurations will be readily apparent to those having ordinary skill in the art without departing from the spirit of the present invention. For example, each protrusion may have only rails, while each recess may define a groove on both angled sides.

Once the first and second panel portions 12, 14 are in place in accordance with the preferred embodiment, the fastening device 50 is employed to secure the first portion 12 to the second portion 14. In this embodiment the fastening device 50 includes a hooked end 52 formed either along the bottom or the top or both ends of either the first portion 12 or the second portion 14, with a notch 54 formed on the opposite sides of second portion 14 so that the hooked end 52 will seat within the notch 54 when alternating protrusions 30 are fully seated within alternating recesses 32. In this manner, the portions will be releasably secured to each other for maintaining the trough for housing communication cables. As will be appreciated, however, any other type of fastening device may be employed to releasably fasten the two panels together without departing from the scope of the present invention.

In the preferred embodiment, the mounting surface 18 is configured as a plurality of tangs 56 preferably spaced equidistant from each other. Each tang has a mounting hole 58 or other securing device for facilitating mounting hereto of interface devices, such as connection blocks (not shown). In a typical application, a single connection block may be mounted across two opposing tangs 56 so that a first end of the connection block is mounted to a tang 56 on the first portion 12 and a second end of the connection block is mounted to a tang 56 on the second portion 14.

Figure 2A:
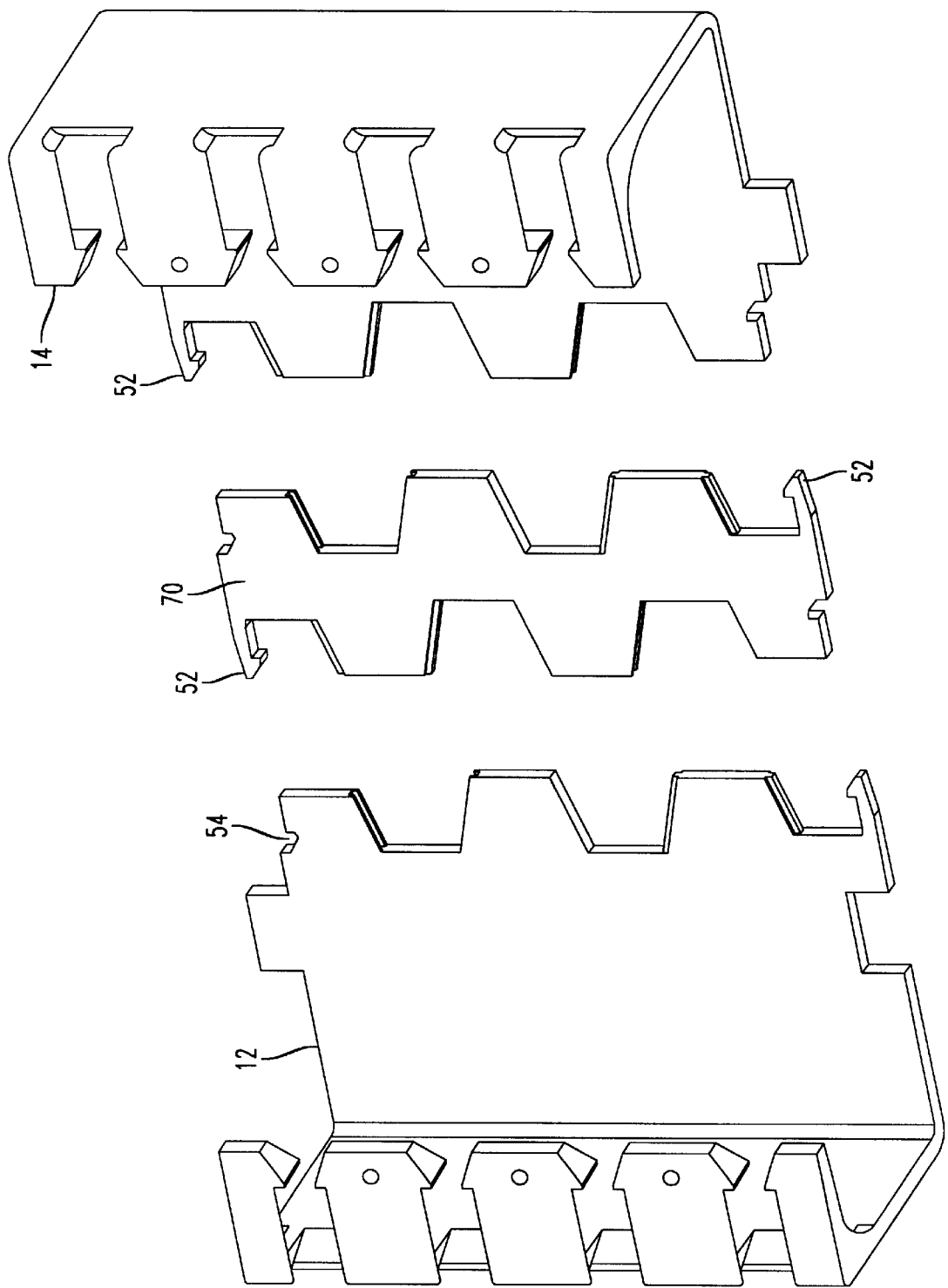
Figure 2B:
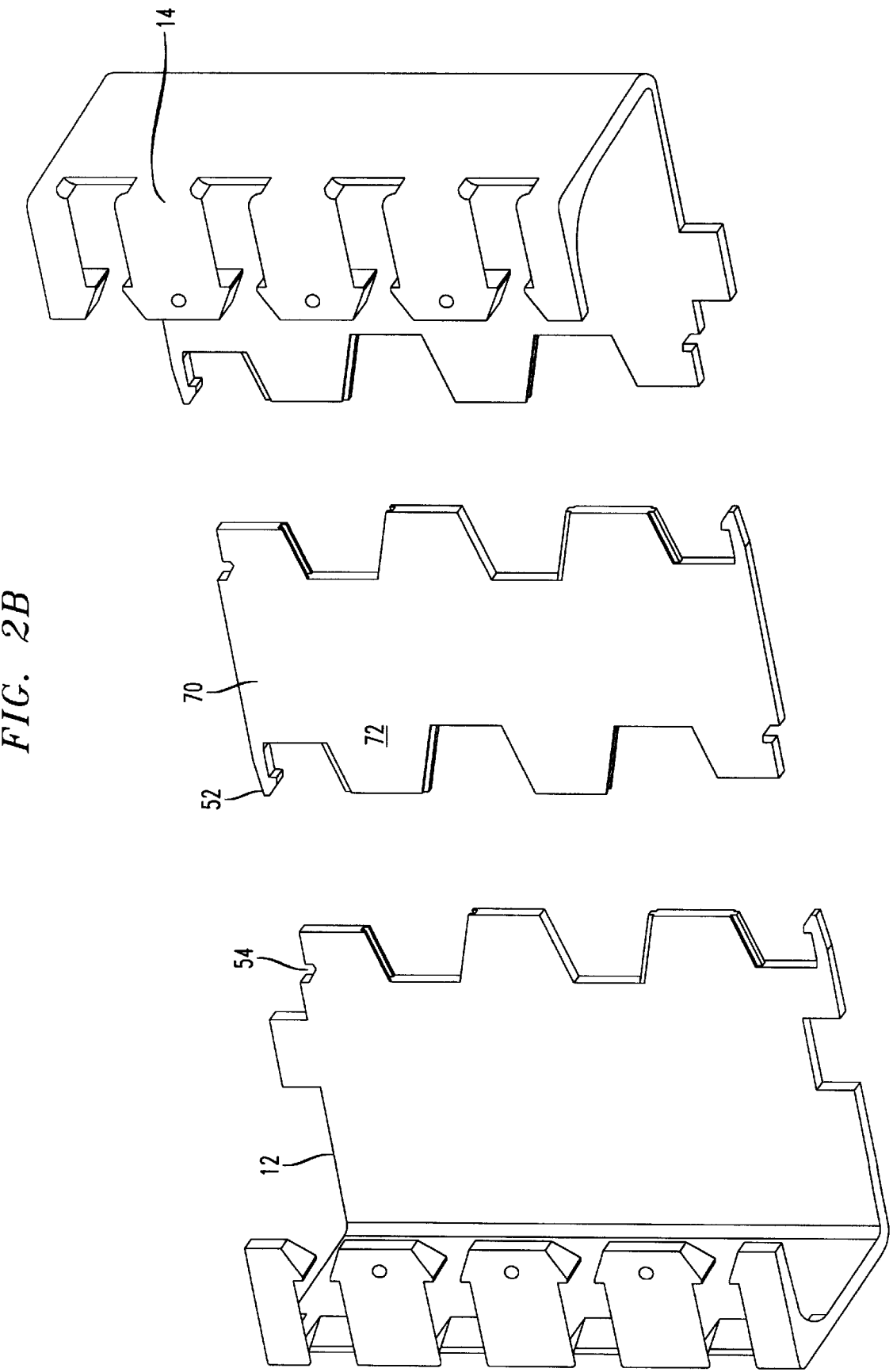

As will be appreciated, the demands of a particular communication system may vary depending on the applications required by a particular business. For example, certain businesses may require data exchange between multiple devices and may, likewise, subsequently increase their communication demands as the business progresses such as by adding additional equipment to a network or by increasing the transmission or data carrying capabilities of a network. In such situations, additional data carrying cables and/or data carrying cables of increased diameter (e.g. a thicker size) may be required or employed to meet the enhanced network demands. In accordance with the present invention the trough space defined within the adjustable modular panel 10 can be increased to accommodate the changing demands of the system and, in particular, to accommodate therein additional and/or thicker cables. This is accomplished, with reference now to FIGS. 2A–2C, by incorporating a third panel 70 located between the first and second portions 12 and 14 to thereby extend the trough width 26 by an amount equal to the width of the third panel 70. As shown, the third panel includes a front face 72 and two engaging edges 74, 76, with each edge 74, 76 defined by a crenelated surface in the manner of the engaging edges 16 and 17 of the first and second portions 12, 14. The edges 74, 76 have alternating protrusions 77 and recesses 79 which, like the protrusions 30 and recesses 32 and the first and second portions 12, 14, contain channels 44 and rails 46 formed therein. When third panel 70 is positioned between first portion 12 and second portion 14, the alternating protrusions and recesses 77, 79 mate with the alternating protrusions 30 and recesses 32 of the first and second portions 12 and 14. The fastening device 50 including hooks and notches 52, 54 is also provided on the third panel for securing the third panel to the first panel portion 12 and second panel portion 14, as shown. When the third panel 70 is in position, thereby extending the width of the trough, certain standard sized connection devices such as connection blocks may no longer fit across opposing tangs 56 due to the increased distance between the opposing tangs. In that event, a mounting surface (not shown) may be formed or secured on surface 18, 19 of panel 12, 14 to provide for mounting of connection devices thereto.

It should be readily apparent that an additional benefit of the present invention is that it allows for additional cables to be added to the trough defined by the modular panel without removing the existing cables from the trough. For example, the first and second panel portions 12, 14 can simply be disengaged from each other to accommodate the third panel 70 without disturbing the existing cables.

Figure 3:
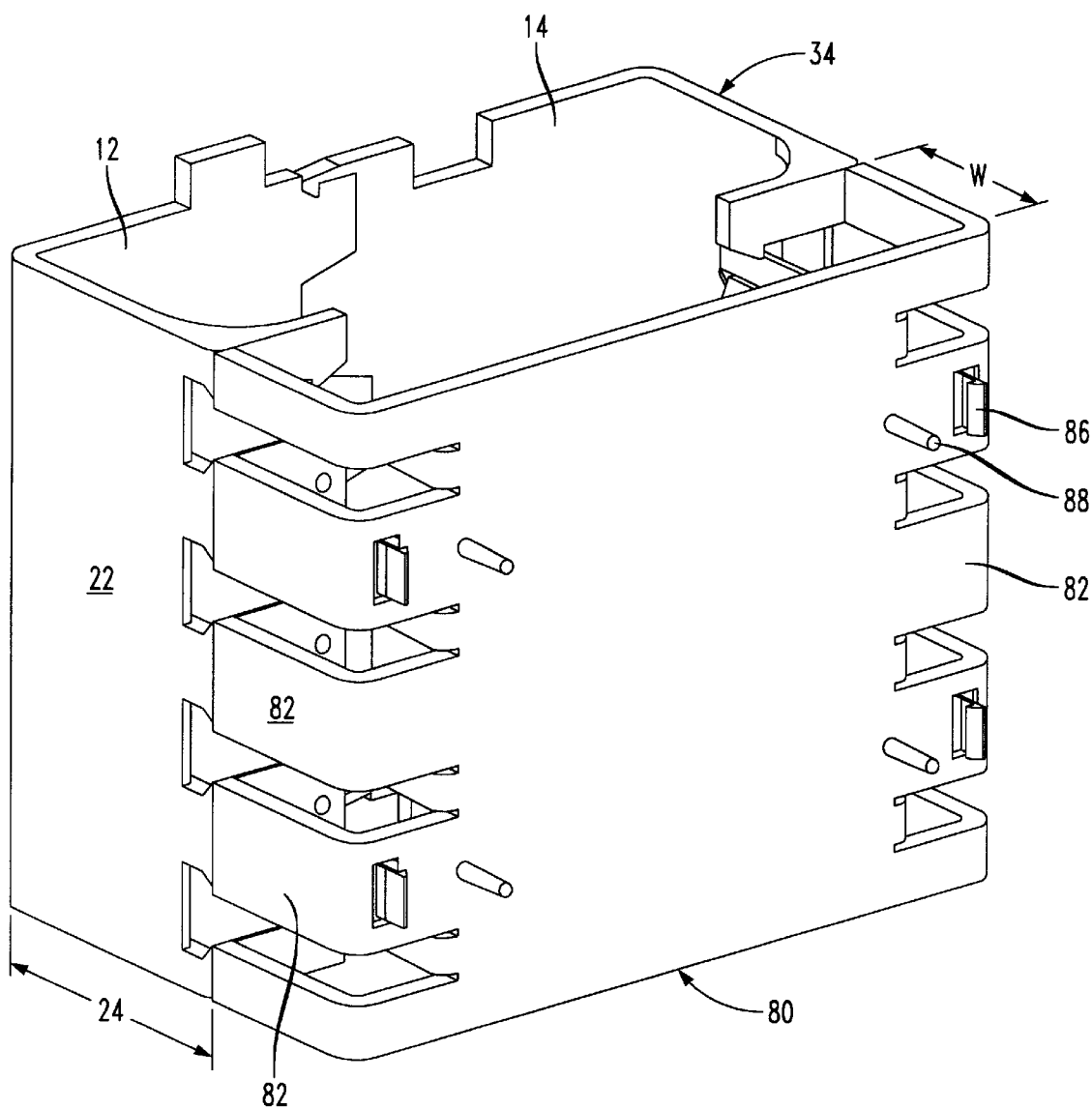
FIG. 3 depicts the adjustable panel of FIG. 1B incorporating an adapter plate in accordance with the present invention.

As explained above, the third panel 70 allows for enlargement of the trough space and, in particular, of the trough width 26 by incorporating a third panel 70 between the first portion 12 and second portion 14. In some instances, however, it may be further or alternatively desirable for the trough to be expanded in an outward direction, e.g., to expand the depth 24 of the trough as opposed to or in conjunction with an expansion of the width 26. To accomplish this, and in accordance with another embodiment of the present invention, an adapter panel 80 is provided for releasable attachment to the mounting surfaces 18 of the first and second portions 12, 14. As shown in FIG. 3, the adapter panel 80 has a plurality of substantially parallel sides 82 preferably configured as protrusions or fingers which engage with the mounting surfaces 18 and/or within spaces located between adjacent tangs 56 on the first and second portions 12, 14. Each protrusion 82 has a particular length which increases the depth 24 of the trough by an amount "W", thereby providing increased space for accommodating additional cables. Adapter panel 80 preferably includes hooks 86 and/or pegs 88 that may be integrally formed therewith for facilitating attachment to the panel 80 of other connecting devices, such as connection blocks, as is known by those having ordinary skill in the art.

In another preferred embodiment, the first and second protrusions 12, 14 may further incorporate a securing means 60 in the form of a notch 62 and a mating protrusion 64 formed on the top and/or bottom surfaces of the portions 12, 14 to accommodate vertical stacking of the modular panels and thereby increase the length of the trough.

Figure 4:
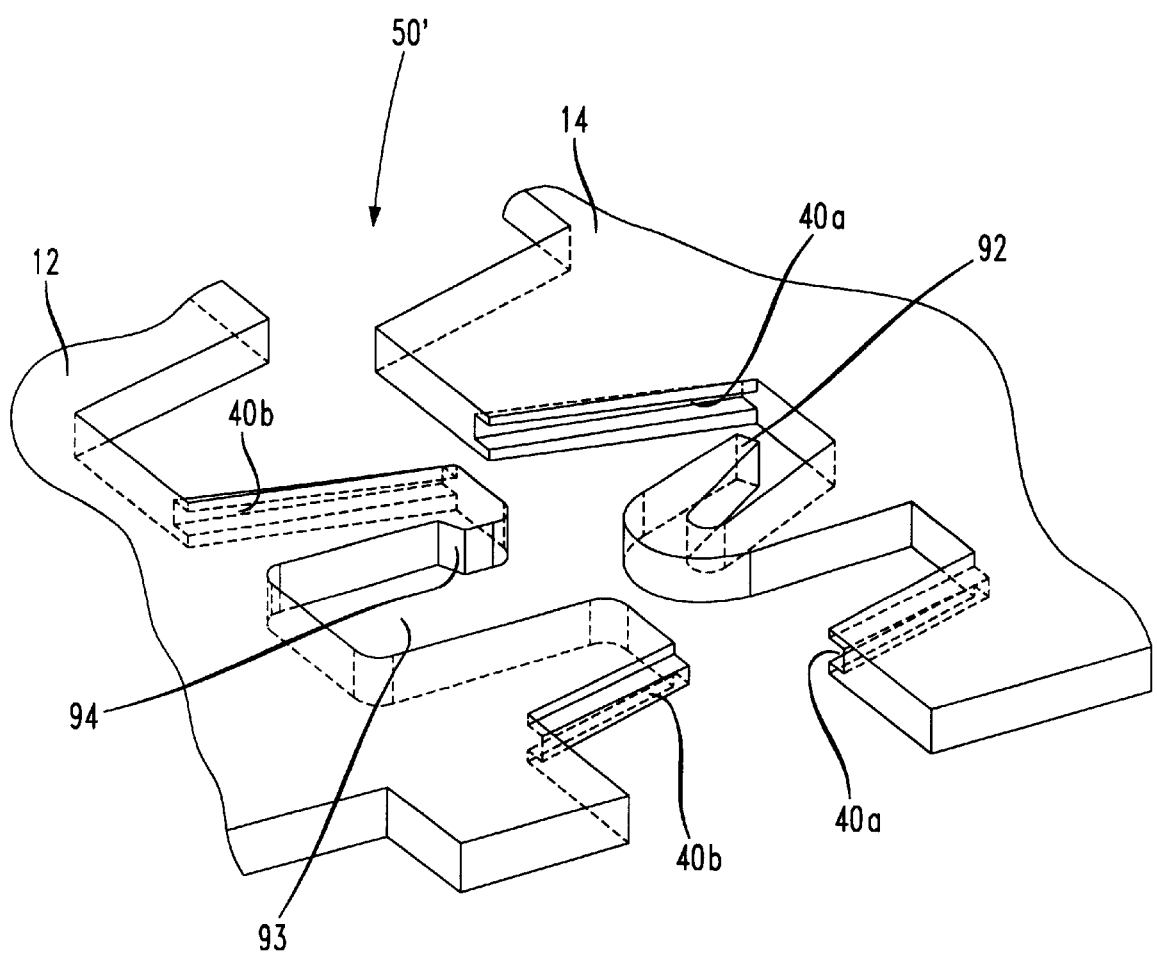
FIG. 4 depicts an alternative panel locking arrangement in accordance with a most preferred embodiment of the present invention.

With reference now to FIG. 4, a most preferred first securing means 50' is shown. The fastening means contains a first section attached to panel 14 having a curved element 92 which seats within a cut away or recess 93 having a hooked defining wall 94. When the panels 12 and 14 are pushed together, curved element 92 seats within recess 93 and is held in place by the hooked defining wall. The panels can be separated, if desired, by applying a force to the curved element to disengage it from the defining wall.

While there have been shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. It is the intention, therefore, to be limited only as indicated by the scope of the claims appended hereto.

We claim:

1. An adjustable modular panel for providing connection sites for cables carrying data for communicating with terminal devices, comprising:
    a first panel having a mounting surface for fastening thereto of connector devices, and a first engaging edge;
    a second panel having a mounting surface for fastening thereto of the connector devices, and a second engaging edge;
    said first and second panels being positionable in predeterminately spaced relation to form a trough having a width for partially housing the cables; and
    a fastening device on said first and second panels for operative engagement to secure said first and second panels to each other in said predeterminately spaced relation when said fastening device is in a locked position, and releasable for facilitating expansion of the trough width to accommodate an increased number of cables when said fastening device is in a released position, wherein said first and second engaging edges define crenellated edges having alternating protrusions and recesses and wherein said protrusions have a defining wall having one of a lip and a channel formed therein and wherein said recesses have a defining wall having the other of the lip and the channel formed therein so that said lips seat within said channels when said fastening device is in the locked position.

2. The adjustable modular panel of claim 1, wherein said mounting surfaces of said first and second panels comprise a plurality of tangs to which the connecting devices are securable.

3. The adjustable modular panel of claim 1, wherein said trough has a depth, said panel further comprising an adapter plate releasably securable to said mounting surfaces of said first and second panels for increasing the depth of said trough.

4. The adjustable modular panel of claim 1, further comprising an extension panel having a width and first and second engaging edges having crenellated surfaces comprised of alternating protrusions and recesses, said extension panel being positionable between the engaging edges of said first and second panels when said fastening device is in the released position for increasing the trough width by an amount not greater than the width of said extension panel.

5. The adjustable modular panel of claim 4, wherein said extension panel further includes means for engaging with said fastening device for accommodating releasable interlocking engagement between said first panel and said extension panel, and between said extension panel and said second panel.

6. An adjustable modular panel for providing connections sites for cables carrying data for communicating with terminal devices, comprising:
    a first panel having a mounting surface for fastening thereto of connector devices, and a first engaging edge;
    a second panel having a mounting surface for fastening thereto of the connector devices, and a second engaging edge;
    an extension panel having a first engaging edge and a second engaging edge for disposition between said first and second panels so that said first engaging edge of said extension panel is positioned in opposed relation to and proximate said first engaging edge of said first panel and said second engaging edge of said extension panel is positioned in opposed relation to and proximate said second engaging edge of said second panel;
    said first and second panels and said extension panel forming a trough bounded by and having a width defined between said first and second panels for partially housing the cables with said trough; and
    a fastening device on said first, second and third panels for releasably securing in a locked position of the fastening device said first panel to said extension panel and said second panel to said extension panel with said extension panel positioned between said first and said second panels.

7. The adjustable modular panel of claim 6, wherein said engaging edges of said first panel, said second panel and said extension panel comprise crenellated edges having alternating protrusions and recesses arranged so that when said fastening device is in the locked position, said alternating protrusions of said first panel engaging edge seat within the recesses of said first engaging edge of said extension panel, said alternating protrusions of said first engaging edge of said extension panel seat within said recesses of said first panel engaging edge, said alternating protrusions of said second panel engaging edge seat within said recesses of said extension panel second engaging edge, and said protrusions of said extension panel second engaging edge seat within the recesses of said second panel engaging edge.

8. The adjustable modular panel of claim 7, wherein said protrusions comprise a defining wall having one of a lip and a channel formed therein and wherein said recesses comprise a defining wall having the other of a lip and a channel formed therein, so that said lips seat within said channels when said fastening device is in the locked position.

9. The adjustable modular panel of claim 7, wherein said trough has a depth, said panel further comprising an adapter plate releasably securable to said mounting surfaces of said first and said second panels for increasing the depth of said trough.

10. An adjustable modular panel for providing connection sites for cables carrying data for communicating with terminal devices, comprising:

a first panel having a mounting surface for fastening thereto of connector devices, and a first engaging edge;

a second panel having a mounting surface for fastening thereto of the connector devices, and a second engaging edge;

said first and second panels being positionable in predeterminately spaced relation to form a trough having a width for partially housing the cables; and a fastening device on said first and second panels for operative engagement to secure said first and second panels to each other in said predeterminately spaced relation when said fastening device is in a locked position, and releasable for facilitating expansion of the trough width to accommodate an increased number of cables when said fastening device is in a released position, said fastening device comprising a hook member attached to one of said first and second panels and a notch formed in the other of said first and second panels, said hook member being releasably seated within said notch when said alternating protrusions are seated within said alternating recesses, and wherein said first and second engaging edges form crenellated edges having alternating protrusions and recesses so that when said fastening device is in the locked position, said alternating protrusions of said first panel seat within said alternating recesses in said second panel, and said alternating protrusions of said second panel seat within said alternating recesses of said first panel.

11. The adjustable modular panel of claim 10, wherein said mounting surfaces of said first and second panels comprise a plurality of tangs to which the connecting devices are securable.

12. The adjustable modular panel of claim 10, wherein said trough has a depth, said panel further comprising an adapter plate releasably securable to said mounting surfaces of said first and second panels for increasing the depth of said trough.

13. The adjustable modular panel of claim 10, further comprising an extension panel having a width and first and second engaging edges having crenellated surfaces comprised of alternating protrusions and recesses, said extension panel being positionable between the engaging edges of said first and second panels when said fastening device is in the released position for increasing the trough width by an amount not greater than the width of said extension panel.

14. The adjustable modular panel of claim 13, wherein said extension panel further includes means for engaging with said fastening device for accommodating releasable interlocking engagement between said first panel and said extension panel, and between said extension panel and said second panel.

* * * * *